UNITED STATES PATENT OFFICE.

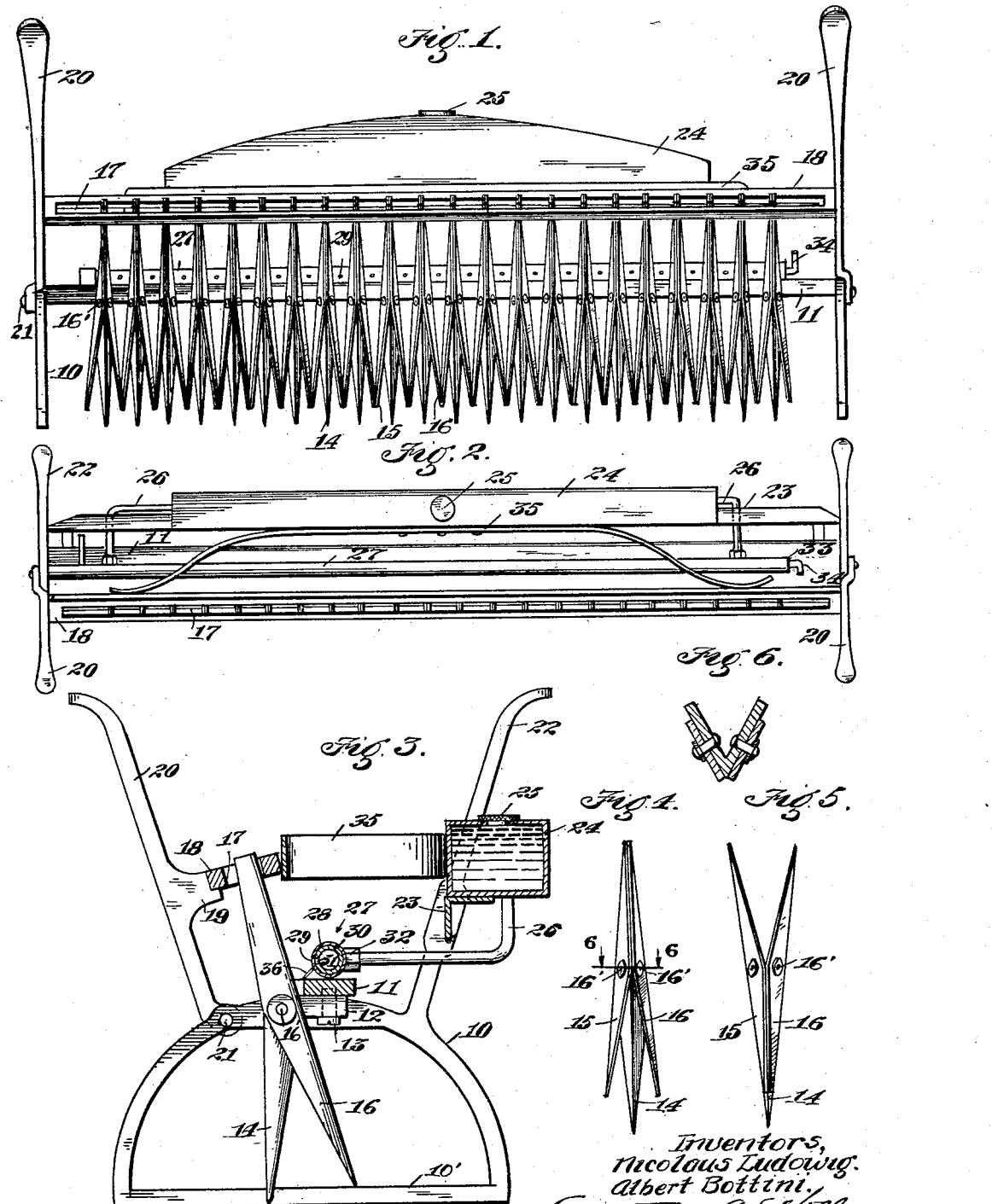

NICOLAUS LUDOWIG AND ALBERT BOTTINI, OF SAN BERNARDINO, CALIFORNIA.

SELF-OILING BREAD-CLIPPING MACHINE.

1,175,158.      Specification of Letters Patent.      Patented Mar. 14, 1916.

Application filed October 2, 1915. Serial No. 53,770.

*To all whom it may concern:*

Be it known that we, NICOLAUS LUDOWIG and ALBERT BOTTINI, citizens of the Empire of Germany and the United States, respectively, residing at San Bernardino, in the county of San Bernardino and State of California, have invented new and useful Improvements in Self-Oiling Bread-Clipping Machines, of which the following is a specification.

Our invention relates to a self oiling bread clipping machine.

Bread clipping machines whereby loaves of dough used for making bread are cut or clipped by means of cutter blades mounted in a machine are well known in the art. The machine of the kind referred to cuts the upper portion of the loaves of dough prior to the rising thereof into a series of lines, usually zigzag lines, extending transversely to the length of the loaf. The effect of such clipping or cutting operation of the dough as described is to cause the top crust of the loaf after baking to assume an undulating or corrugated surface increasing greatly the amount of crust. In the machines heretofore used it was necessary to oil thoroughly the parts of the machine coming in contact with the dough in order to prevent the adhesion between said parts and the dough. The usual way of oiling the parts is to brush over the parts of the machine which come in contact with the dough with a brush dipped in an edible oil, such as olive oil or cottonseed oil. A liberal application of oil to the parts referred to was necessary after cutting each loaf.

It is an object of this invention to provide means in connection with a bread clipping machine supplying a liberal amount of oil to those parts of the machine which come in contact with the dough.

With this and other objects in view which will appear as the description proceeds, our invention consists of the construction and arrangement of parts hereinafter described and claimed.

In the accompanying drawings which form a part of this specification, we have illustrated a practical and convenient form of our invention, and in which—

Figure 1 is a front elevation of the improved bread clipping machine. Fig. 2 is a top plan view thereof. Fig. 3 is a side elevation looking from the right of Fig. 1. Figs. 4 and 5 are detailed views showing the cutter blades in inoperative and operative positions, respectively. Fig. 6 is a detail view on line 6—6 of Fig. 4.

10, 10 designates the end support of the bread clipping machine. These supports are semi-circular in shape, having a horizontal base member 10'. A horizontal bar 11 is rigidly connected at either end with said supports. On the under side of bar 11, is a series of lugs 12 spaced from each other at equal intervals and suitably fastened to said bar by means of bolts 13. The lugs 12 extend for a short distance at right angles to the front of the bar 11. Each lug has secured at its forward end a vertical tooth shaped member 14, L shaped in cross section, extending vertically downward therefrom. The open angle of said L shaped members faces toward the rear of the machine. At the adjacent sides of the upper end of member 14, a pair of clipping or cutter blades 15, 16 is pivoted by means of pivot pins 16'. (See Figs. 4–6.) The cutter blades are made of steel plates having the shape of an obtuse triangle. The portions below the pivot pins 16' are of a size and shape to register with the sides of the tooth shaped member 14. The blades 15, 16 when in the inoperative position, have the inner edges of their upper portions side by side while the lower portions form an acute angle with the member 14. The upper parts of the cutter blades 15, 16 extend through a longitudinal horizontal slot 17 provided in the slotted bar 18, which is rigidly mounted at its extremities to lugs 19, 19 projecting intermediate the ends of the pivoted handles 20, 20. These handles are pivoted at their lower ends to the supporting member 10, 10. The pivot pin 21 is disposed on the supports in front of the bar 11. A pair of rear handles 22, 22, rigidly connected to the supporting members 10, 10, extend upwardly therefrom and to the rear of the side of bar 11. A horizontal bracket 23 connecting the handles 22 at a point intermediate the ends thereof support a longitudinal oil container 24, rectangular in cross section, adapted to contain an edible oil. A screw cap 25 in the top of container serves for filling the same. From opposite ends of the oil container, oil pipes 26 lead to the oiling device 27. The oiling device 27 consists of an outer tube 28 disposed along the upper face of bar 11. The top is provided on the side toward the cutter blades with a series of perforations 29 in horizontal alinement. Rotatably mounted within said outer tube is an inner tube 30 with a series of perforations 31 in horizontal alinement and adapted to register with the perforations 29 of the outer tube. The inner tube is provided with openings 32 opposite to the ends of oil pipes 26 whereby the interior of the inner tube is supplied with oil from the container 24. At one end the outer tube is closed but at the other end it is open as at 33. The inner tube is closed at both ends and has the end extending beyond the open end 33 of the outer tube turned at approximately a right angle to form a handle 34 whereby the inner tube may be rotated so as to bring the perforations 31 thereof in and out of register with the perforations 29 of the outer tube. A bow shaped leaf spring 35 is secured to the front of the oil container 24 and has its ends in sliding engagement with the adjacent face of the slotted bar 18.

*Operation.*—The oil container is filled with an edible oil and the inner oil tube 30 is rotated to cause its perforations to register with the perforations of the outer tube. With the cutter blades in their inoperative position as shown in Fig. 3, the machine is placed over the loaf of bread dough so that the bread dough will lie between the end supports 10, 10 of the machine. In placing the machine on the table supporting the loaf of bread dough, the tooth shaped member 14 will sink into and cut through the dough but will not quite pierce the bottom layer thereof by reason of the fact that said members do not extend quite down to a plane passing through the lower face of base members 10 of the end supports. The ends of the cutter blades will likewise extend for some distance, but to a less extent than the tooth shaped member, into the dough, the blades 15 of one tooth shaped member 14 touching the blade 16 of the adjacent member. When the handles are pressed toward each other in opposition to the leaf spring 35, the cutter blades will be caused to swing on their pivot pins 16' causing the lower faces to slide along and close upon the adjacent triangular faces of the tooth shaped member, as clearly shown in Fig. 5, so that the blades will lie in close and parallel relation thereto. The upper ends will spread apart occupying the position shown in Fig. 5. When the lower portion of the cutter blades have been closed upon and lie flat and parallel to the adjacent faces of the tooth shaped member as just described, the machine is lifted vertically upward and away from the loaf of the dough. The loaf of dough will have a zigzag line cut throughout the length thereof. During all this time oil has been running out of the perforations 29 of the outer tube 28 passing down a longitudinal dash board 36 leading from the outer tube along the line below the perforation 29 to the fore part of the bar 11. A copious flow of oil all along the bar supplies each tooth shaped member and cutter blade with oil. The supply will be especially abundant between the adjacent surfaces of the cutter blades and the tooth shaped member because of capillary attraction. The supply of oil will keep all those parts, which come in contact with the dough, moist with oil and will effectively prevent any adhesion between the dough and said parts. When the machine is not in use the inner tube 30 is rotated by means of the small handle 34 so as to cause the perforations of the inner tube to be out of register with the perforations of the outer tube.

It is thus seen that we have devised means for oiling a bread clipping machine which is simple of construction, positive in operation and which furnishes a liberal supply of oil to the tooth shaped member and the cutter blades which are the parts of the machine coming in contact with the dough.

While we have shown the preferred construction of the oiling device as now known to us, it will be understood that we do not desire to confine our invention to the specific form illustrated and described. Various changes in the construction and arrangement of the parts of the machine may be made by those skilled in the art without departing from the spirit of our invention as covered by the appended claims.

We claim:

1. The combination of a bread clipping machine having a series of downwardly extending fixed tooth shaped members, a series of movable clipping blades arranged in pairs, each of said members being provided with two of said blades pivoted on adjacent sides thereto, means for actuating said blades, and an oiling device, said oiling device comprising an oil tank, an outer tube disposed adjacent to said members and said blades, said outer tube having a series of perforations arranged in longitudinal alinement, an inner tube rotatably mounted in said outer tube and provided with a series of perforations adapted to register with the perforations of the outer tube, manually operated means for actuating said inner tube, a conduit connecting said inner tube to said tank, and means conducting the oil from said outer tube to said tooth shaped members and said blades.

2. The combination of a bread clipping machine having a series of movable clipping blades, means for actuating said blades, and an oiling device, said oiling device comprising an oil tank, an outer tube disposed adjacent to said blades, and having a series of perforations arranged in longitudinal alinement, an inner tube movably mounted in said outer tube and provided with a series of perforations adapted to register with the perforations of the outer tube, manually operated means for actuating said inner tube, and a conduit connecting said inner tube to said tank.

3. The combination of a bread clipping machine having a series of movable clipping blades, means for actuating said blades, and an oiling device, said oiling device comprising an oil receptacle, an outer tube disposed adjacent to said blades and having a series of perforations, an inner tube movably mounted in said outer tube and provided with a series of perforations adapted to register with the perforations of the outer tube, means for actuating said inner tube, and a conduit connecting said inner tube to said tank.

4. The combination of a bread clipping machine having a series of movable clipping blades, and an oiling device, said oiling device comprising an oil receptacle, an outer tube supplying said blades with oil, said outer tube having a series of perforations, an inner tube mounted in said outer tube and provided with a series of perforations adapted to register with the perforations of the outer tube, means for causing the perforations of said outer tube to register with the perforations of said inner tube, and means conducting oil from said tank to said inner tube.

5. The combination of a bread clipping machine having a series of pivoted clipping blades, the pivots of said blades being in horizontal alinement, an oiling device therefor, said oiling device comprising a perforated tube adjacent and parallel to said pivots, means to close the perforations of said tube and a receptacle supplying an edible oil to said tube.

6. The combination of a bread clipping machine having a series of pivoted clipping blades, an oiling device therefor, said oiling device comprising a perforated tube extending adjacent to the pivots of said blades and means supplying an edible oil to said pivots.

7. The combination of a bread clipping machine having a series of pivoted clipping blades, an oiling device for said blades, said oiling device comprising a perforated tube adjacent to said blades and means for supplying an edible oil to said tube.

8. The combination of a bread clipping machine having a series of clipping blades and an oiling device therefor, said oiling device comprising a tube adjacent to said blades provided with means for supplying oil to each of said blades and means for supplying an edible oil to said tube.

9. The combination of a bread clipping machine having a series of clipping blades and means for supplying an edible oil to each of said blades.

In testimony whereof we have signed our names to this specification.

NICOLAUS LUDOWIG.
ALBERT BOTTINI.

Copies of this patent may be obtained for five cents each, by addressing the "Commissioner of Patents, Washington, D. C."